US007971677B2

(12) United States Patent
Ekren et al.

(10) Patent No.: US 7,971,677 B2
(45) Date of Patent: Jul. 5, 2011

(54) WORK MACHINE VEHICLE HAVING SEAT MOUNTED CONTROLS WITH NESTED SEATBAR

(75) Inventors: Jeremy W. Ekren, Fargo, ND (US);
Aaron G. Hill, Forman, ND (US);
Joshua F. Maus, Fargo, ND (US);
Lance S. Tuhy, Lisbon, ND (US);
Rodney Koch, Mooreton, ND (US);
Jason J. Asche, Stirum, ND (US)

(73) Assignee: Clark Equipment Company, West Fargo, ND (US)

( * ) Notice: Subject to any disclaimer, the term of this patent is extended or adjusted under 35 U.S.C. 154(b) by 115 days.

(21) Appl. No.: 12/360,272

(22) Filed: Jan. 27, 2009

(65) Prior Publication Data
US 2010/0187858 A1 Jul. 29, 2010

(51) Int. Cl.
*B62D 1/02* (2006.01)
(52) U.S. Cl. ...................................................... 180/329
(58) Field of Classification Search .................. 180/326, 180/329, 330, 331, 333; 280/748; 297/411.32
See application file for complete search history.

(56) References Cited

U.S. PATENT DOCUMENTS

| | | | |
|---|---|---|---|
| 3,640,572 A | 2/1972 | Doehler | |
| 3,861,637 A | 1/1975 | DeLongchamp | |
| 4,391,344 A | 7/1983 | Weber et al. | |
| 4,397,371 A * | 8/1983 | Lynnes et al. | 180/271 |
| 4,478,308 A * | 10/1984 | Klaassen | 180/326 |
| 4,730,691 A * | 3/1988 | Grigg | 180/326 |
| 5,050,700 A | 9/1991 | Kim | |
| 5,129,478 A | 7/1992 | Suenaga et al. | |

(Continued)

FOREIGN PATENT DOCUMENTS
DE 19615591 A 10/1997
(Continued)

OTHER PUBLICATIONS

Search Report and Written Opinion dated Mar. 17, 2010 for International application No. PCT/US2010/021616, filed Jan. 21, 2010.

(Continued)

*Primary Examiner* — Paul N Dickson
*Assistant Examiner* — Robert A Coker
(74) *Attorney, Agent, or Firm* — John D. Veldhuis-Kroeze; Westman, Champlin & Kelly, P.A.

(57) ABSTRACT

Disclosed are work machine vehicles having an operator protective structure with a seat mounted in the operator protective structure. In disclosed embodiments, first and second adjustable armrest assemblies are mounted to a structure of the seat such that the first and second armrest assemblies can be adjusted in fore and aft directions relative to a seatback of the seat. Vehicle controls are integrated with the first and second adjustable armrest assemblies such that adjustment of the first and second adjustable armrest assemblies adjusts positions of the vehicle controls relative to an operator sitting on the seat. After adjustment, the vehicle controls and the operator sitting on the seat are maintained at constant relative positions with respect to each other even as the work machine vehicle moves over rough terrain and the seat moves up and down. A nested seatbar is pivotably mounted to a structure of the work machine vehicle such that the nested seatbar can be moved to a down position in which portions of the nested seatbar are located between the first and second adjustable armrests.

17 Claims, 7 Drawing Sheets

U.S. PATENT DOCUMENTS

| | | | |
|---|---|---|---|
| 5,383,532 A * | 1/1995 | Shonai et al. | 180/269 |
| 5,470,190 A | 11/1995 | Bamford et al. | |
| 5,524,722 A | 6/1996 | Bowman et al. | |
| 5,894,905 A * | 4/1999 | Abels et al. | 180/268 |
| 5,938,237 A * | 8/1999 | Abels | 280/753 |
| 5,971,434 A * | 10/1999 | Neufeld et al. | 280/756 |
| 5,984,040 A * | 11/1999 | Lee | 180/271 |
| 6,296,221 B1 | 10/2001 | Nadeau | |
| 6,299,207 B1 * | 10/2001 | Bares | 280/748 |
| 6,425,450 B1 | 7/2002 | Lansberry | |
| 6,450,284 B1 * | 9/2002 | Sakyo et al. | 180/329 |
| 6,550,560 B2 | 4/2003 | Carleton | 180/272 |
| 6,732,829 B2 * | 5/2004 | Bares | 180/271 |
| 6,916,057 B2 | 7/2005 | Teich | |
| 2002/0074179 A1 | 6/2002 | Brandt et al. | |
| 2002/0145325 A1 * | 10/2002 | Clevenger | 297/411.32 |
| 2006/0000656 A1 | 1/2006 | Bisick et al. | |
| 2007/0145805 A1 | 6/2007 | Bower | |

FOREIGN PATENT DOCUMENTS

| | | |
|---|---|---|
| EP | 0445933 A1 | 9/1991 |
| EP | 1069002 A1 | 1/2001 |
| EP | 1201833 A1 | 5/2002 |
| JP | 10131235 A | 5/1998 |
| JP | 2004130828 A | 4/2004 |
| KR | 20070012909 A | 1/2007 |

OTHER PUBLICATIONS

Search Report and Written Opinion dated Jun. 28, 2010 for International application No. PCT/US2010/021611, filed Jan. 21, 2010.
Office Action issued Mar. 31, 2011 for U.S. Appl. No. 12/360,276.

* cited by examiner

FIG. 8

WORK MACHINE VEHICLE HAVING SEAT MOUNTED CONTROLS WITH NESTED SEATBAR

BACKGROUND

Work machine vehicles of various types are frequently operated over rough terrain. Examples of work machine vehicles include compact construction equipment and off-road construction equipment, such as skid steer loaders, compact track loaders, all-wheel steer loaders, excavators, telehandlers, and backhoe loaders. Other work machines include tractors and other agricultural equipment. Still other types of work machine vehicles exist. In many types of work machine vehicles, such as skid steer or other types of loaders, the vehicles typically include a cab or operator protective structure in which an operator seat and vehicle controls are located. Joystick vehicle controls are common in construction vehicles such as skid steer loaders. Also, seatbar safety devices are also common in work machine vehicles, to protect the operator while seated and operating the vehicle.

Operator seats are typically allowed to move on a suspension as the vehicle travels over uneven terrain during operation. Commonly, the joystick or other vehicle controls are mounted in the cab, such that movement of the operator seat on the suspension results in movement of the operator relative to the vehicle controls. The fact that the operator seat (and thus the operator) moves relative to the vehicle controls increases the difficulty for the operator in controlling the vehicle operation, particularly over rough terrain. In addition to the increased difficulty of controlling the vehicle in these situations, operator comfort is also negatively impacted.

The discussion above is merely provided for general background information and is not intended to be used as an aid in determining the scope of the claimed subject matter.

SUMMARY

Disclosed are work machine vehicles having an operator protective structure with a seat mounted in the operator protective structure. In disclosed embodiments, first and second adjustable armrest assemblies are mounted to a structure of the seat such that the first and second armrest assemblies can be adjusted in fore and aft directions relative to a seatback of the seat. Vehicle controls are integrated with the first and second adjustable armrest assemblies such that adjustment of the first and second adjustable armrest assemblies adjusts positions of the vehicle controls relative to an operator sitting on the seat. After adjustment, the vehicle controls and the operator sitting on the seat are maintained at constant relative positions with respect to each other even as the work machine vehicle moves over rough terrain and the seat moves up and down. A nested seatbar is pivotably mounted to a structure of the work machine vehicle such that the nested seatbar can be moved to a down position in which portions of the nested seatbar are located between the first and second adjustable armrests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Disclosed embodiments are directed to seat mounted vehicle control and safety seatbar configurations for use in work machines. The disclosed combined configurations of seat mounted vehicle controls with a rigidly mounted safety seatbar make it easier for the operator to enter and exit the work machine, while providing ample room to the operator while operating the machine. In accordance with disclosed embodiments, the seatbar nests with seat mounted controls that provide the operator with adjustability and a platform that maintains the same relative position between the controls and the operator, even while the operator controls the machine to travel over rough terrain.

The nested seatbar configuration, with the seatbar rigidly mounted to the work machine's structural components rather than also being mounted on the seat, also allows the controls to be comfortably manipulated by the operator. The controls can be suspended from arm rests that are adjustable. This makes the controls configurable to different sized operators, further making the machine more comfortable and easier to operate. Since the arm rests are suspended from the seat, once adjusted, the armrests and vehicle controls move along with movement of the seat, thus providing a constant relative positioning between the controls and an operator occupying the seat. This makes the work machine easier to operate while the machine is moving and the seat moves up and down on its suspension.

Disclosed embodiments of work machine vehicles, having the seat mounted vehicle controls and nested safety seatbar configuration, include, but are not limited to compact construction equipment and off-road construction equipment, such as skid steer loaders, compact track loaders, all-wheel steer loaders, excavators, telehandlers, and backhoe loaders. Other work machines include tractors and other agricultural equipment. Still other types of work machine vehicles exist. Disclosed embodiments can be utilized in any of these or other types of work vehicles.

Figure 1:
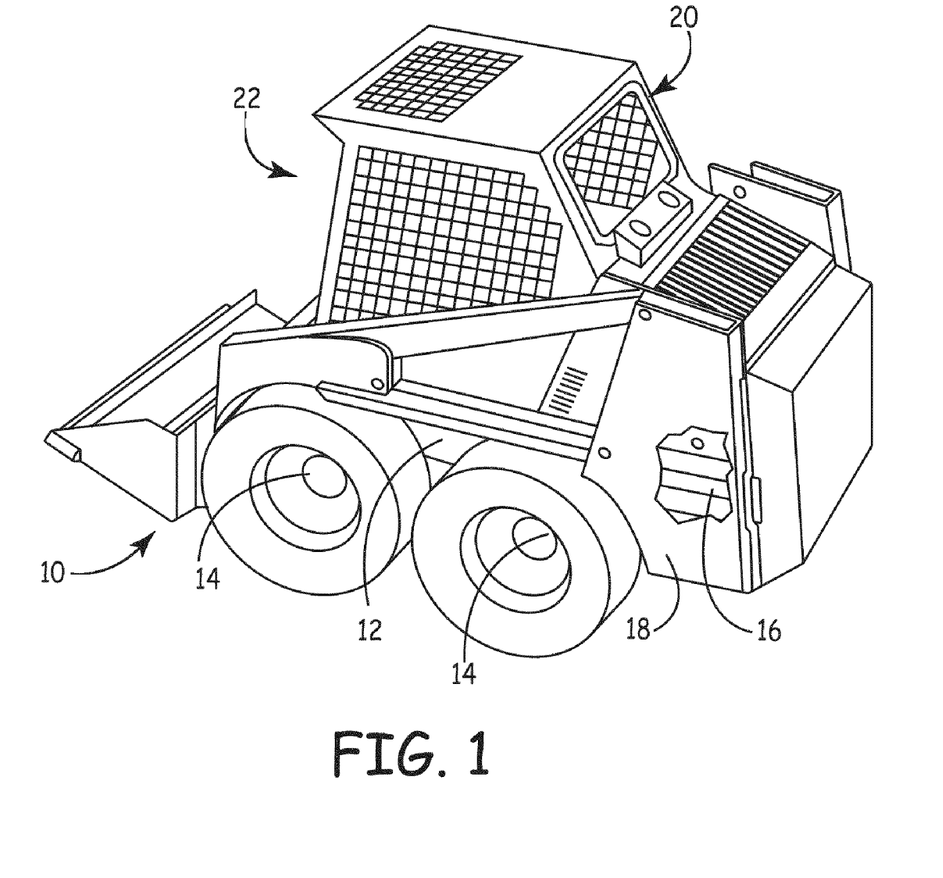
FIG. 1 is a perspective view of a typical skid steer loader representing various types of work machine vehicles fitted with seat mounted joystick controls and a nested seatbar in accordance with disclosed embodiments.

FIG. 1 depicts a work machine vehicle 10 in the form of a skid steer loader. Though illustrated in the form of a skid steer loader, vehicle 10 need not be a skid steer loader in all embodiments, but rather can be other types of compact construction equipment or other work machine vehicles. The skid steer loader depicted in FIG. 1 includes a frame 12, mounted on wheels 14 that are driven through a suitable power train, such as hydraulic motors that in turn are driven from pumps. The pumps are driven from an engine 16 mounted in an engine compartment 18 that is to the rear of an operator's cab or enclosure 20, which is also referred to as an operator protective structure. The operator's cab 20 is entered and exited from the front indicated at 22, in this embodiment.

Figure 2:
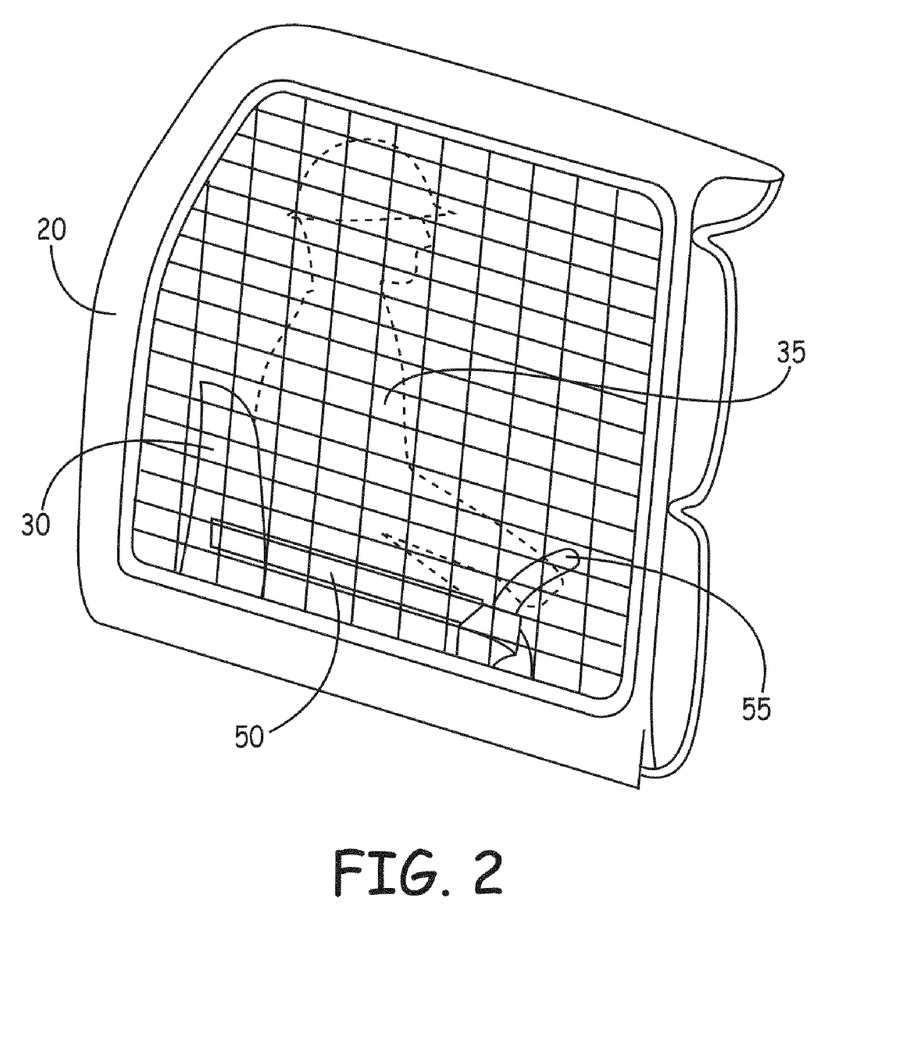
FIG. 2 is a diagrammatic side view illustration of a cab or operator protective structure having seat mounted joystick controls.

FIG. 2 depicts an example embodiment of operator cab 20. Positioned within operator cab 20 is a seat 30 on which an operator sits while controlling operations of the vehicle 10. Adjustable armrest assemblies 50 are suspended from seat 30. Vehicle controls 55, for example in the form of joystick controls, are integrated with or attached to armrest assemblies 50. Adjustment of armrest assemblies 50 then provides adjustment of controls 55 relative to operator 35 and seat 30. As seat 30 moves up and down on its suspension (not shown), armrest assemblies 50 and controls 55 move with the seat. Thereby, a substantially constant relative positioning between the joystick controls and the operator can be maintained, even as the vehicle moves over rough terrain. To allow vehicle controls 55 to be suspended from armrest assemblies 50 and used by vehicle operator 35, a protective seatbar (not shown in FIG. 2) is nested between the armrest assemblies. This is described in greater detail below.

Figure 3:
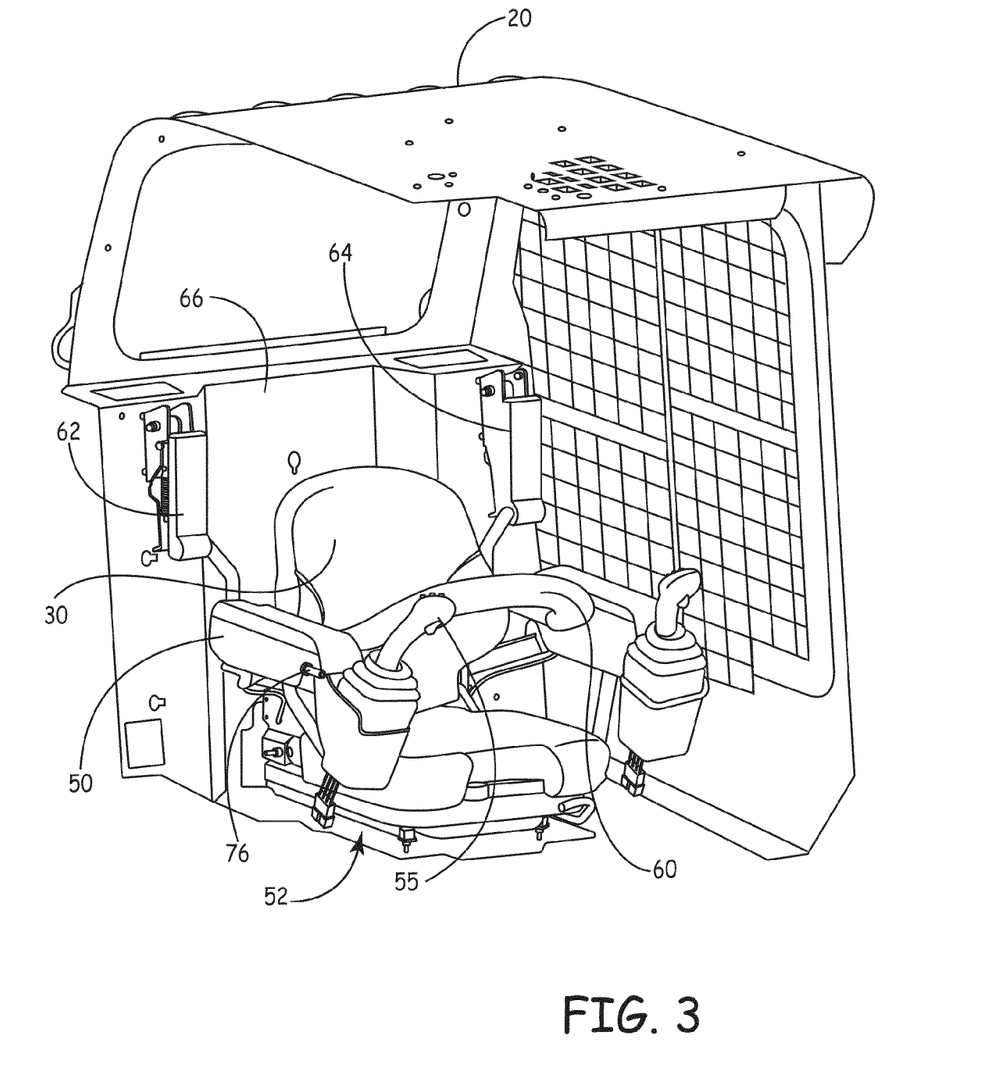
FIG. 3 is a perspective view of portions of the cab, showing the seat mounted joystick controls and the nested seatbar in greater detail.

Referring now to FIG. 3, shown is a perspective view of operator cab 20 which illustrates the combination of seat 30 with seat mounted vehicle controls 55 and a rigidly mounted safety seatbar 60. As shown in FIG. 3, seat 30 is positioned in cab 20. Seat 30 is supported in cab 20 on a seat suspension (represented generally at 52, but not shown in detail), which allows up and down movement of seat 30 as vehicle 10 moves over terrain.

On each of the right and left hand sides of seat 30, adjustable armrest assemblies 50 are fixedly attached or coupled to a structure of seat 30 such that the armrest assemblies 50 move up and down with seat 30 on suspension 52. Mounted on each armrest is a vehicle control mechanism 55 for controlling operation of vehicle 10. In the illustrated embodiment, vehicle controls 55 are joystick vehicle controls which are integral with, or suspended from, armrest assemblies 50 such that movement of the armrest assemblies also moves vehicle controls 55. For example, using slide control lever 76, the operator 35 can selectably control armrest assemblies 55 to slide fore and aft relative to the seatback, and thereby relative to the vehicle operator. By adjusting armrest assemblies in the fore and aft directions relative to the seatback, vehicle controls 55 are adjusted for the particular operator's size and comfort preferences. Since vehicle controls are suspended from armrest assemblies 50, up and down movement of seat 30 on suspension 52 also causes up and down movement of vehicle controls 55. Thus, the seat mounted vehicle controls are maintained at a substantially constant position relative to the operator 35, even when seat 30 moves up and down as the vehicle travels over rough terrain.

Also shown in FIG. 3 is nested safety seatbar 60. Seatbar 60 is rigidly mounted to the work machine's structural components. For example, as shown in FIG. 3, seatbar 60 is rigidly mounted or secured to a surface 66 of cab 20 (or other structural surface of the work machine) using mounting brackets 62 and 64. In exemplary embodiments, the surface(s) 66 on which seatbar 60 is mounted is positioned behind seat 30. In accordance with disclosed embodiments, when rotated downward to protect the operator during operation of the vehicle, seatbar 60 nests inside of the armrest assemblies. Seatbar 60 being a nested seatbar relative to the armrest assemblies requires that portions of seatbar 60 extending forward of the seatback be positioned generally between the two armrest assemblies. Although the operator is not shown in FIG. 3, the nested seatbar will be positioned between each armrest assembly and the operator while the vehicle is in use.

Figure 4:
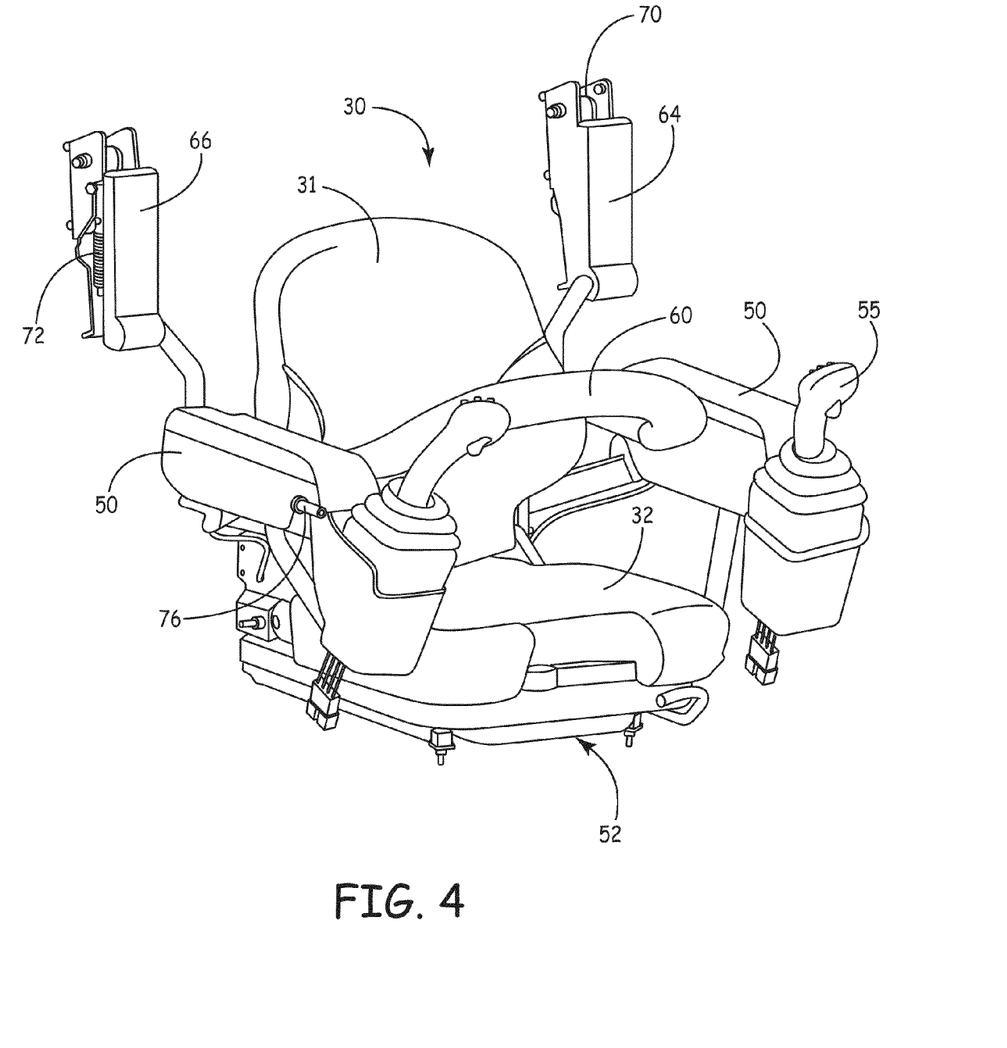
FIG. 4 is a perspective view of the seat, seat mounted joystick controls and nested seatbar shown in FIG. 3, but without other portions of the cab being illustrated.

Referring now to FIG. 4, shown is the combination of seat 30 with seat mounted vehicle controls 55 and a rigidly mounted safety seatbar 60 shown in FIG. 3, but without cab 20 being illustrated. In FIG. 4, certain features are referenced more clearly. For reference purposes, seat 30 is shown having a seatback 31 and a seat cushion 32. Above references to fore and aft movement of the armrest assemblies relates to movement of upper portions of the armrest assemblies away from or toward seatback 31, which is the same as movement away from or toward the vehicle operator.

Another feature shown more clearly in FIG. 4 is a Hall-effect sensor 70 positioned in or adjacent to mounting bracket 64. Hall-effect sensor 70 prevents the vehicle from being operated unless seatbar 60 is in its down position to protect the vehicle operator. Also shown in FIG. 4 are over-center springs 72 in the mounting bracket assemblies (only the over-center spring in bracket assembly 66 is shown). Over-center springs 72 apply forces which aid in keeping the seatbar in the down position. Once an operator has lifted the seatbar past an over-center position, springs 72 then apply forces which aid in lifting the seatbar and keeping the seatbar in the up position. Once the operator has pulled the seatbar down past the over-center position, springs 72 again apply forces which aid in lowering the seatbar.

Figure 5:
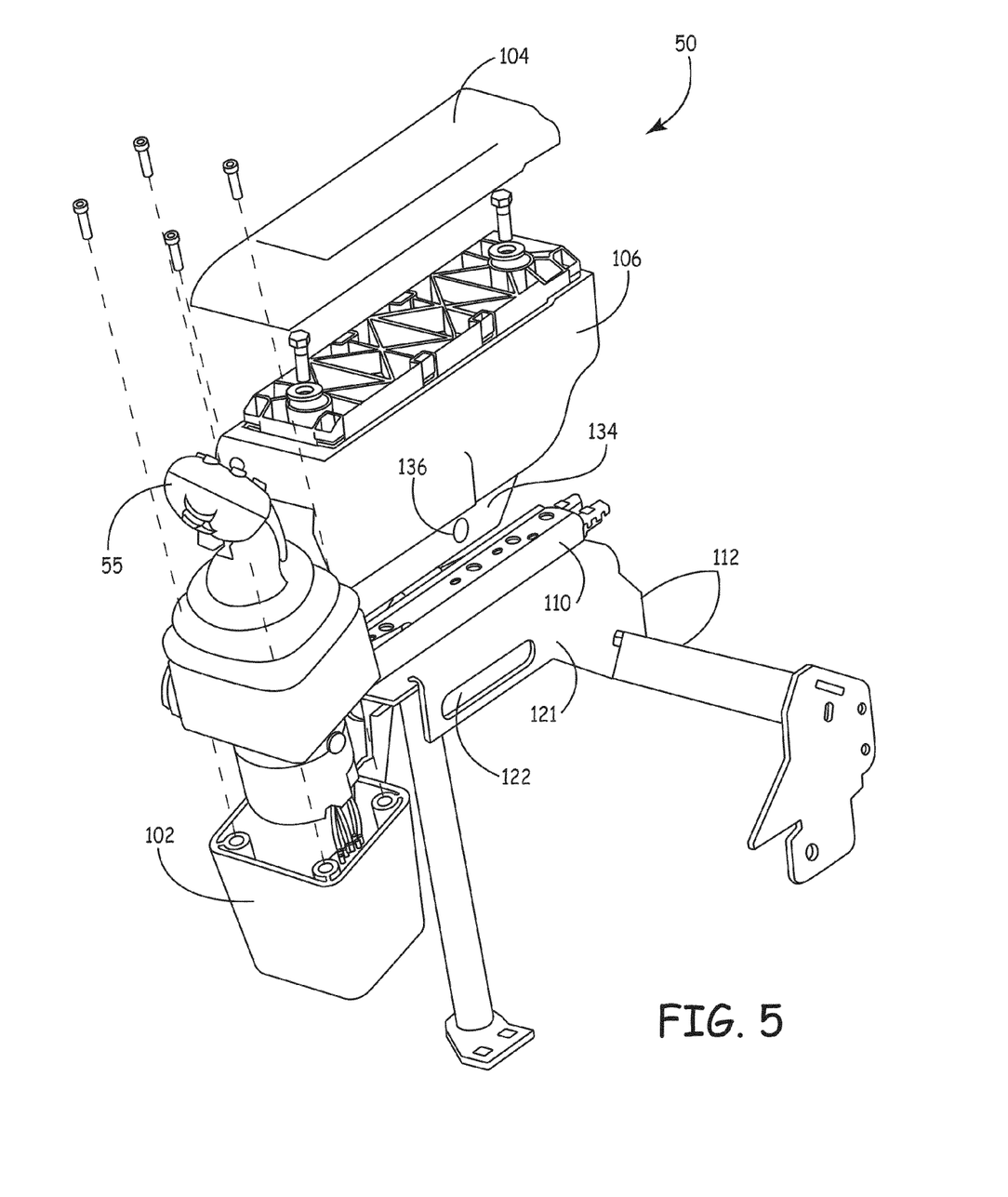
FIG. 5 is a perspective view of a right armrest assembly showing the seat mounted joystick controls.

Referring now to FIG. 5, an armrest assembly 50 is illustrated in greater detail. The armrest assembly 50 shown in FIG. 5 is a right hand armrest assembly. The left hand armrest assembly, though not shown in the detail of FIG. 5, can be constructed to be similar to the right hand armrest assembly, for example being mirror images of each other. The left and right hand armrests are, in some embodiments, individually adjustable by the operator such that the left and right hand side vehicle controls 55 can be individually adjusted for the preferences of particular operators of the vehicle.

As shown in FIG. 5, armrest assembly 50 includes a joystick vehicle controller 55 and a joystick protective cup 102. Cup 102 is mounted to the armrest assembly and protects the wires and other electrical or mechanical components of joystick controller 55. A cover 104 of armrest assembly 50 snap fits, or otherwise attaches, to armrest shell 106. Cover 104 can be, for example, a soft rubber or synthetic molded cover on which the operator's arms can rest while using the vehicle controls 55.

Shell 106 bolts onto, or otherwise attaches to, a slide rail 110, and travels back and forth with the joystick controller 55. The slide rail 110 slides relative to an armrest bracket 1 12. Armrest bracket 112 is fixedly secured to the structure of seat 30 such that bracket 112 moves up and down with the seat as the vehicle moves over rough terrain. A torque inhibiting portion 121 of armrest bracket 112 has a slot 122 formed therein. Slot 122 is part of a torque inhibiting mechanism 120 shown and described with reference to FIGS. 6 and 7.

Figure 6:
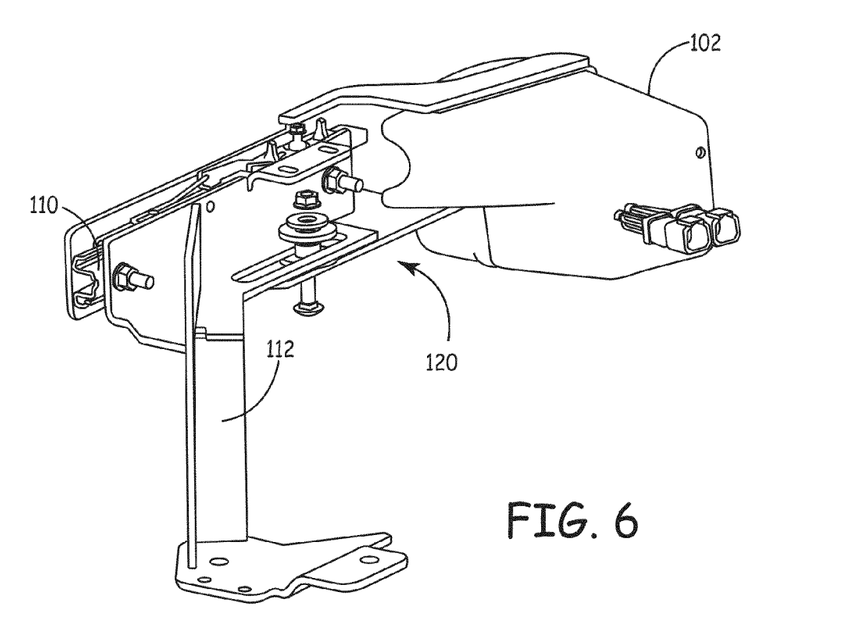
FIG. 6 is a perspective bottom view of the right armrest assembly and an armrest mounting bracket, illustrating features of some example embodiments.
Figure 7:
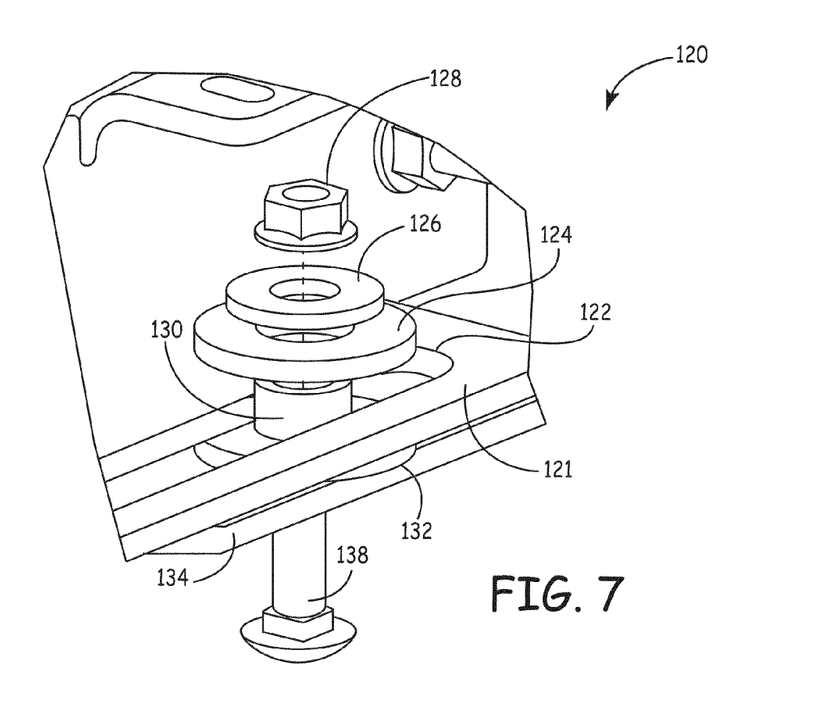
FIG. 7 is a more detailed perspective view of portions of the right armrest assembly and the armrest mounting bracket shown in FIG. 5.

Referring now to FIGS. 6 and 7, shown are perspective views of the torque inhibiting mechanism 120 which allows fore and aft sliding movement of the shell, cover and joystick controls on the slide rail 110, but inhibits torque motions up and down or side to side. As can be seen, torque inhibiting mechanism 120 includes the slot 122 formed in the portion 121 of armrest bracket 112. A spacer 130 is positioned within slot 122. On one side of spacer 130, a plastic washer 124 and a second washer 126 are positioned. On the other side of spacer 130, a second plastic washer 132 is positioned between portion 121 of bracket 112 and a portion 134 of the armrest shell 106. Portion 134 can also be seen in FIG. 5. A bolt 138 extends through an aperture 136 (shown in FIG. 5) in portion 134, plastic washer 132, spacer 130 in slot 122, plastic washer 124, and washer 126. Bolt 138 and nut 128 are tightened down such that plastic washers 124 and 132 restrict movement, other than fore and aft movement, between portion 121 of bracket 112 and portion 134 of the armrest shell. With spacer 130 positioned in slot 122 and being able to slide fore and aft therein, mechanism 120 allows fore and aft adjustment of the armrest assembly while inhibiting torque motions of the armrest up and down or side to side.

Figure 8:
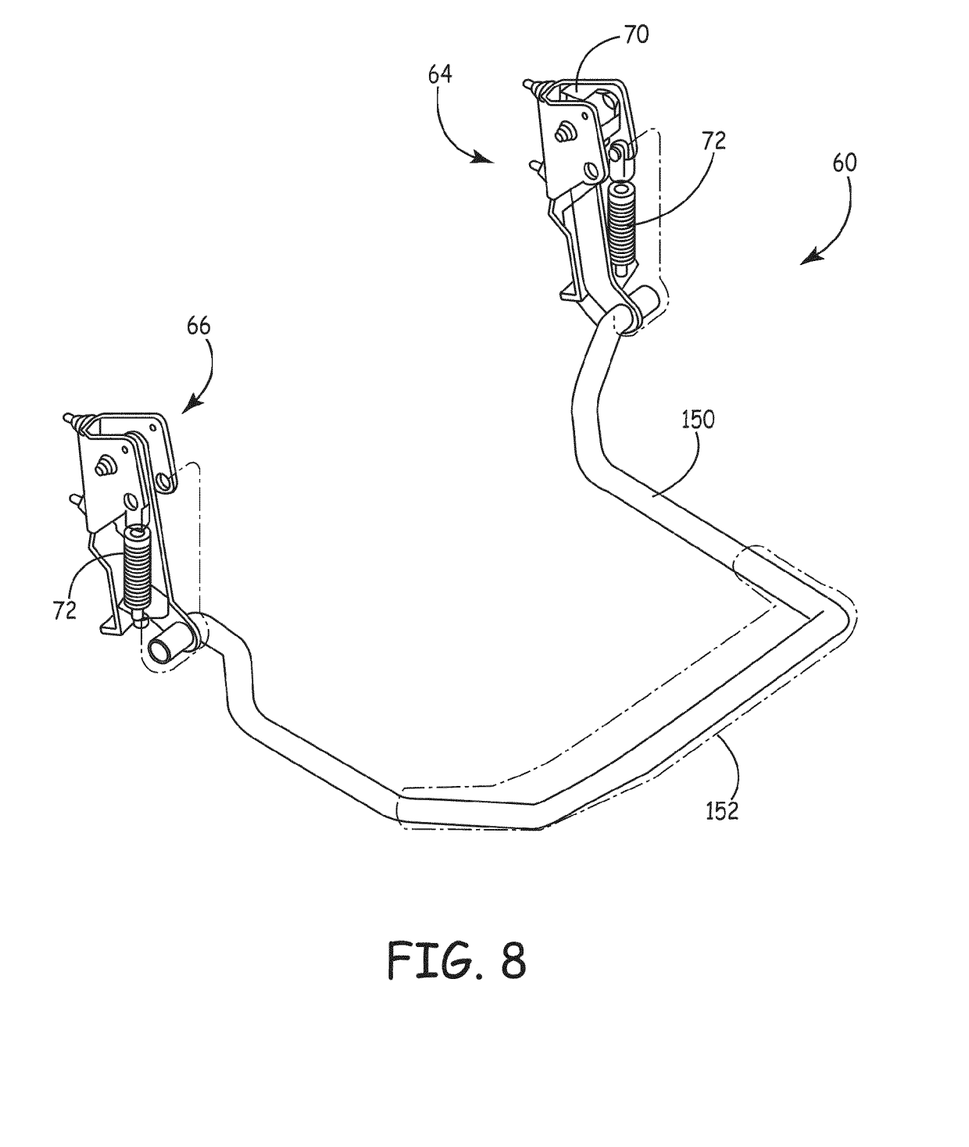
FIG. 8 is a perspective view illustrating an example embodiment of the nested seatbar assembly.

Referring now to FIG. 8, shown is a perspective view of seatbar assembly 60, illustrating features in greater detail. As can be seen, each of mounting brackets 64 and 66 have over-center springs 72 in this example embodiment, though this need not be the case in all embodiments. Also, FIG. 8 illustrates the actual seatbar 150, rotatably coupled to mounting brackets 64 and 66, with over-molded foam covering 152 represented in dashed lines.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the armrest assemblies, and the slide mechanisms which allow fore and aft sliding motion, can be implemented using other components than those shown in the example embodiments. Also, different component shapes, materials, attachment mechanisms, slide mechanisms, etc., can be used to implement the disclosed concepts. Other examples of modifications of the disclosed concepts are also possible, without departing from the scope of the disclosed concepts.

What is claimed is:

1. A work machine vehicle comprising:
an operator protective structure;
a seat positioned in the operator protective structure;
first and second adjustable armrest assemblies mounted to a structure of the seat such that the first and second armrest assemblies can be adjusted in fore and aft directions relative to a seatback of the seat, but such that the first and second adjustable armrest assemblies are restricted from movement in directions other than the fore and aft directions;
vehicle controls integrated with the first and second adjustable armrest assemblies such that adjustment of the first and second adjustable armrest assemblies adjusts positions of the vehicle controls relative to an operator sitting on the seat, and such that after adjustment the vehicle controls and the operator sitting on the seat are maintained at constant relative positions with respect to each other even as the work machine vehicle moves over rough terrain and the seat moves up and down; and
a nested seatbar pivotably mounted to a structure of the work machine vehicle, the nested seatbar being moveable to a down position in which the nested seatbar is located substantially between the first and second adjustable armrests.

2. The work machine vehicle of claim 1, wherein the nested seatbar is pivotably mounted to a portion of the operator protective structure rearward of the seat.

3. The work machine vehicle of claim 1, wherein each of the first and second adjustable armrest assemblies includes a slide mechanism which allows the armrest assembly to be adjusted in the fore and aft directions.

4. The work machine vehicle of claim 3, wherein the vehicle controls comprise joystick vehicle controls.

5. The work machine vehicle of claim 1, and further comprising torque inhibiting mechanisms, separate from the slide mechanisms, coupled to each of the first and second armrest assemblies, each torque inhibiting mechanism allowing the coupled armrest assembly to be adjusted in the fore and aft directions, but inhibiting torque motions of the armrest assembly up and down or side to side relative to the fore and aft directions.

6. The work machine vehicle of claim 5, and further comprising first and second armrest brackets, each of the first and second armrest brackets fixedly mounting one of the first and second armrest assemblies to the structure of the seat.

7. The work machine vehicle of claim 6, wherein each torque inhibiting mechanisms comprises:
a slot formed in one of the armrest brackets;
an aperture formed in one of the armrest assemblies;
a spacer positioned in the slot such that the spacer can slide in the slot in the fore and aft directions;
first and second washers positioned on opposite sides of the spacer; and
a fastener extending through the aperture, the spacer positioned in the slot, and the first and second washers, the fastener coupling the one of armrest brackets, the one of the armrest assemblies, the spacer and the first and second washers together to allow fore and aft movement of the one of the armrest assemblies, but inhibiting torque motions of the armrest assembly up and down or side to side relative to the fore and aft directions.

8. The work machine vehicle of claim 1, wherein the vehicle comprises a loader.

9. A work machine vehicle comprising:
an operator protective structure;
a seat positioned in the operator protective structure;
first and second adjustable armrest assemblies mounted to the seat such that the first and second armrest assemblies can be adjusted in fore and aft directions relative to the seat;
vehicle controls integrated with the first and second adjustable armrest assemblies such that adjustment of the first and second adjustable armrest assemblies adjusts positions of the vehicle controls relative to an operator sitting on the seat, and such that after adjustment the vehicle controls and the operator sitting on the seat are maintained at constant relative positions with respect to each other even as the work machine vehicle moves over rough terrain and the seat moves up and down; and
a nested seatbar mounted to a structure of the work machine vehicle, the nested seatbar being moveable to a down position in which portions of the nested seatbar are located between the first and second adjustable armrests.

10. The work machine vehicle of claim 9, wherein the nested seatbar is mounted to a portion of the operator protective structure rearward of the seat.

11. The work machine vehicle of claim 10, wherein the nested seatbar is pivotably mounted to the portion of the operator protective structure rearward of the seat.

12. The work machine vehicle of claim 11, wherein each of the first and second adjustable armrest assemblies includes a slide mechanism which allows the armrest assembly to be adjusted in the fore and aft directions.

13. The work machine vehicle of claim 12, and further comprising torque inhibiting mechanisms, separate from the slide mechanisms, coupled to each of the first and second armrest assemblies, each torque inhibiting mechanism allowing the coupled armrest assembly to be adjusted in the fore and aft directions, but inhibiting torque motions of the armrest assembly up and down or side to side relative to the fore and aft directions.

14. The work machine vehicle of claim 13, and further comprising first and second armrest brackets, each of the first and second armrest brackets fixedly mounting one of the first and second armrest assemblies to the structure of the seat.

15. The work machine vehicle of claim 14, wherein each torque inhibiting mechanisms comprises:
    a slot formed in one of the armrest brackets;
    an aperture formed in one of the armrest assemblies;
    a spacer positioned in the slot such that the spacer can slide in the slot in the fore and aft directions;
    first and second washers positioned on opposite sides of the spacer; and
    a fastener extending through the aperture, the spacer positioned in the slot, and the first and second washers, the fastener coupling the one of armrest brackets, the one of the armrest assemblies, the spacer and the first and second washers together to allow fore and aft movement of the one of the armrest assemblies, but inhibiting torque motions of the armrest assembly up and down or side to side relative to the fore and aft directions.

16. The work machine vehicle of claim 13, wherein the vehicle controls comprise joystick vehicle controls.

17. The work machine vehicle of claim 16, wherein the vehicle comprises a loader.

\* \* \* \* \*